April 19, 1966  M. E. FRY  3,246,690
AIR COOLED BROILER
Original Filed Nov. 5, 1958  3 Sheets-Sheet 1

INVENTOR.
Millard E. Fry
BY Edwin S. Dybvig
His Attorney

April 19, 1966           M. E. FRY           3,246,690
AIR COOLED BROILER
Original Filed Nov. 5, 1958           3 Sheets-Sheet 2

INVENTOR.
Millard E. Fry
BY Edwin S. Dybvig
His Attorney

April 19, 1966 M. E. FRY 3,246,690
AIR COOLED BROILER

Original Filed Nov. 5, 1958 3 Sheets-Sheet 3

INVENTOR.
Millard E. Fry
BY
Edwin S. Dybvig
His Attorney

United States Patent Office 3,246,690
Patented Apr. 19, 1966

3,246,690
AIR COOLED BROILER
Millard E. Fry, Dayton, Ohio, assignor to General Motors Corporation, Detroit, Mich., a corporation of Delaware
Original application Nov. 5, 1958, Ser. No. 772,107. Divided and this application Mar. 18, 1963, Ser. No. 274,887
5 Claims. (Cl. 165—64)

This invention is directed to a domestic appliance and more particularly to an air cooled broiling arrangement for a range and is a division of my copending application Serial No. 772,107, filed November 5, 1958 and now abandoned.

One of the more difficult tasks in a homemaker's work is concerned with cleaning the kitchen range. During cooking operations grease spatter from pans placed within an oven falls upon the interior walls of the oven and becomes baked thereon due to the high temperatures within the oven. The high temperatures found within the oven so harden the grease spatter that a cleaning procedure is made most difficult thereby. A copending application S.N. 654,221 filed April 22, 1957, is directed to a high sided broiler pan which effectively blocks spatter from reaching the interior walls of the oven. In this arrangement the broil pan is designed to nest in an inverted cover which includes an amount of water to maintain the sides of the broil pan at temperature levels which will maintain the spatter in a fluid state. Although this arrangement has been highly successful it has the disadvantage of requiring attention to assure water remains between the nested pans so that grease will not bake on the broil pan walls.

Accordingly it is an object of this invention to provide an improved broiling arrangement for a range wherein spatter is prevented from reaching the oven walls by a high sided broil pan which is air cooled.

It is a further object of this invention to use a source of cooling air directed over the surface of a pan being used for broiling.

It is also an object of this invention to provide a broil pan having relatively high side walls with a cover suitable for nesting in spaced relationship to said pan, said cover having a handle which is removable to form an air inlet for said broil pan.

It is also an object of this invention to provide an oven with an induced draft fan and an access door for facilitating air flow through said oven during a broiling operation.

It is a more specific object of this invention to provide an oven with a support rack having a detachable blower means.

A further specific object of this invention is to provide a broil pan assembly having a food containing portion nesting within and spaced from a cover portion, to the latter of which is attached an air impelling means for forcing air between said food containing member and said cover member.

A further object of this invention is to provide an air impelling means for cooling a broil pan which will be energized with the energization of the broiling element.

Further objects and advantages of the present invention will be apparent from the following description, reference being had to the accompanying drawings, wherein preferred forms of the present invention are clearly shown.

Figure 1:
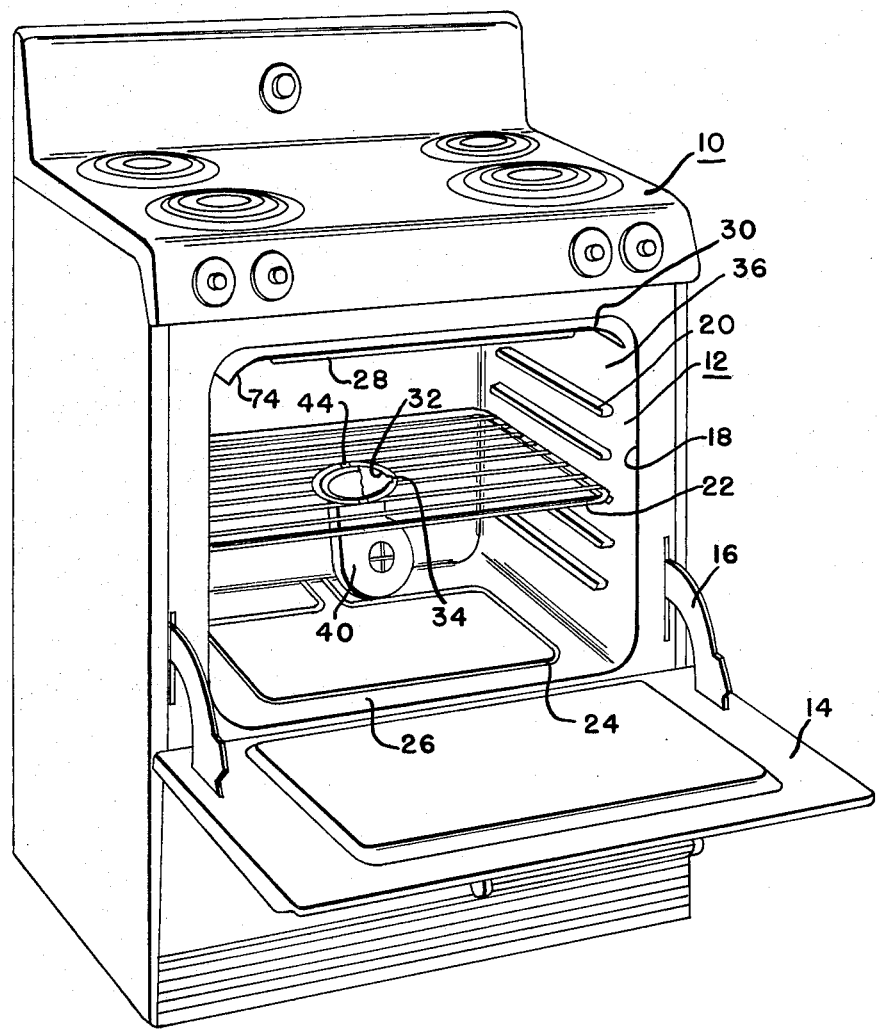
FIGURE 1 is a perspective view of a domestic range suitable for use with this invention and showing a modified blower support rack designed in accordance with this invention.

In accordance with this invention and with reference to FIGURE 1 a domestic range 10 is provided with an oven 12 having a door 14 hingedly mounted at 16 for closing a front opening 18 of the oven 12. The oven 12 includes protuberances or embossments 20 on the side walls thereof for supporting a plurality of racks such as 22 which in turn are utilized to support cooking utensils within the oven 12. For providing the necessary cooking operations a bake unit 24 lies substantially on a bottom wall 26 of the oven while a broil unit 28 is supported near the top portion of the oven 12. The broil unit 28 is supported conventionally on a reflector plate 30 which aids in radiating heat from the broil unit 28 into the pans or utensils placed upon the support rack 22 during a broiling operation. The reflector shield 30 is formed with side portions which extend downwardly for preventing spatter from splashing out of the broiling utensil as will be explained more fully hereinafter.

One of the novel aspects of this invention is embodied in the support rack 22 which is constructed with a central opening 32 to which an air impelling means 40 may be attached. For purposes of attachment the opening 32 may have a plurality of notches 34 which cooperate with tabs 44 formed on the air impeller 40, a slight relative rotation serving to join the air impelling means to the support rack opening 32. For a detailed understanding of this air cooling arrangement reference may be had to FIGURE 2 wherein the oven 12 is formed with side walls 36 from which the support rack protuberances 20 are arranged to project in spaced fashion for receiving a support rack such as 22. Centrally located in the support rack 22 the opening 32 is defined by a collar member 38 in which the notches 34 referred to hereinbefore are formed. An air impelling means or blower such as 40 is formed with a connecting outlet portion 42 on which the tabs 44 are placed in complementary relationship to the notches 34 in the support rack collar 38. Thus a bayonet type attachment is effected whereby the connecting portion 42 of the blower 40 is inserted within the collar 38, the tabs passing through the notches 34. After the insertion, the blower may be rotated a quarter of a turn in either direction to securely interconnect the blower and the support rack 22. Of course, it should be understood that any method of attaching the blower and support rack will suffice for the purposes of this invention and only one means therefor is described.

Figure 2:
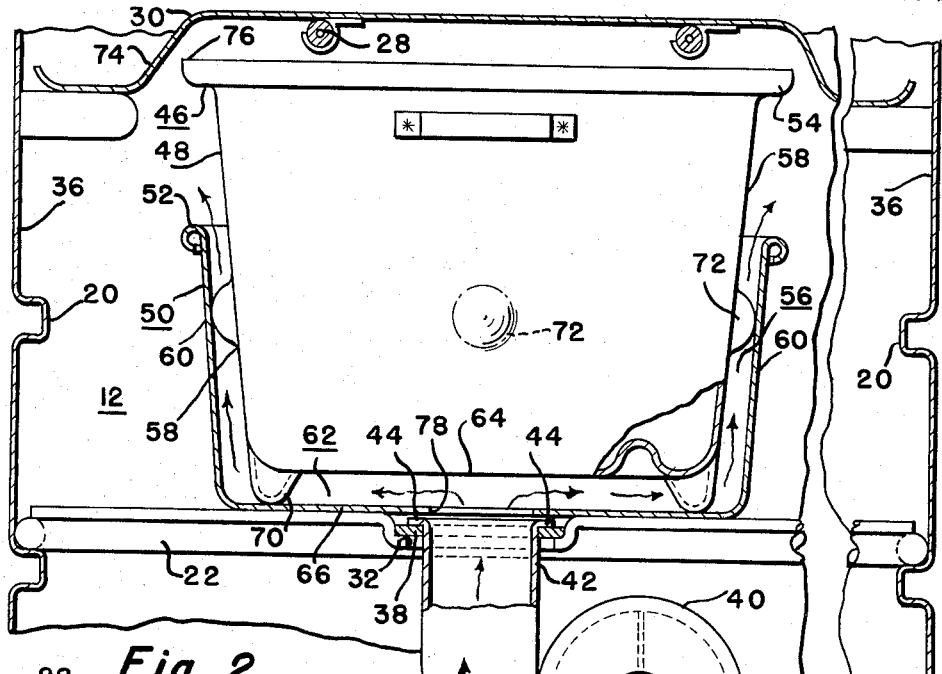
FIGURE 2 is a fragmentary front sectional view of an oven provided with the air cooled broil pan of this invention.

Arranged to cooperate with the blower 40 and adapted to be supported by the rack 22 is a broil pan assembly shown generally at 46. The assembly 46 is comprised of a food containing broil pan or bottom member 48 and a cover member or air duct forming portion 50. The cover member 50 is formed with a peripheral flange portion 52 which fits within a top opening forming shoulder 54 on the broil pan 48 when the assembly 46 is utilized as a cover pan or baking utensil. As shown in FIGURE 2 the broil pan assembly 46 is placed in a nested relationship, the broil pan or bottom member 48 nesting within the cover member 50 through the opening defined by the peripheral flange portion 52 during a broiling operation.

Figure 3:
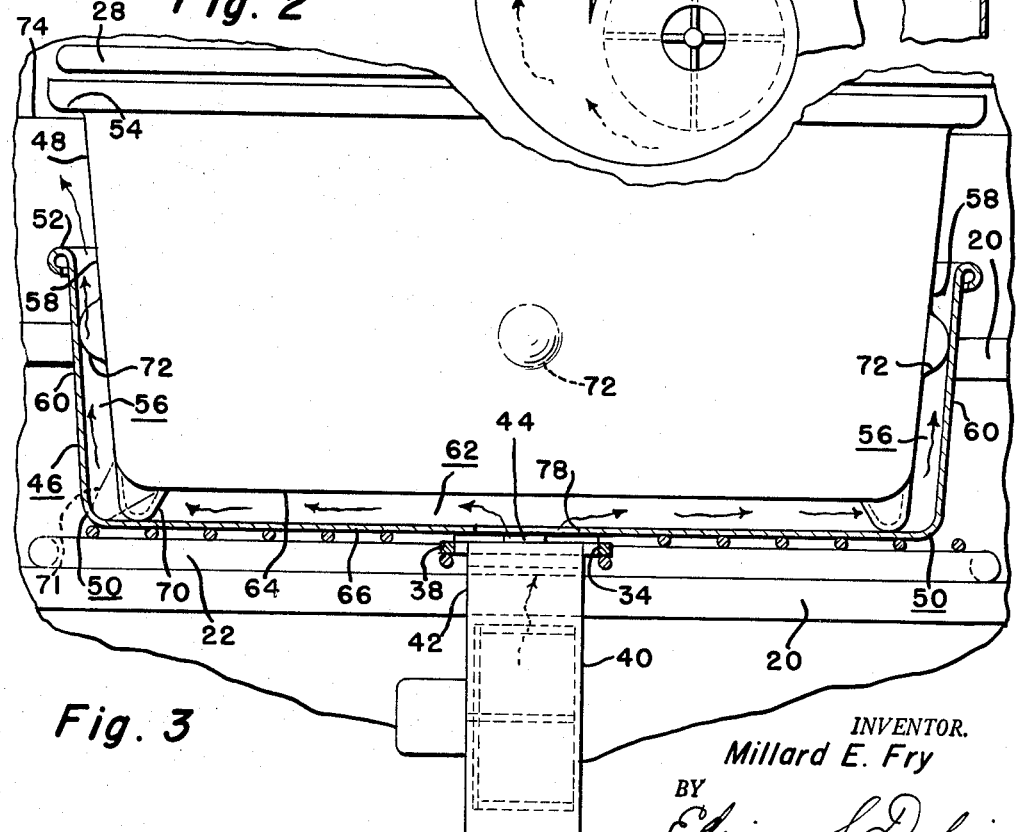
FIGURE 3 is a fragmentary side elevation of the air cooled broil pan of FIGURE 2.

It is important for the purposes of this invention that an air space 56 be provided between the side walls 58 of the broil pan member 48 and the side walls 60 of the cover. Similarly an air space 62 is necessary between the bottom 64 of the broil pan 48 and the top 66 of the cover 50. To effect the desired spacing a plurality of protuberances such as 70, 72 are struck out from or installed on the bottom wall 64 and side walls 58 of the broil pan member 48. The protuberances 70 may be placed on an angle (as shown in phantom at 71 in FIGURE 3) to form the desired ducts 56, 62 between the broil pan 48 and cover member 50, thereby eliminating the side wall protuberances 72. With this relationship the operation of blower 40 will induce a circulation as shown by the arrows in the bottom space or duct 62 and the side space or duct 56 to maintain the broil pan member 48 and the side walls 58 thereof at a relatively cool temperature which will maintain the grease spatter in a liquid state. During the broiling operation the oven door 14 is retained in a partially open position in accordance with conventional practice. The air motion will prevent the grease spatter falling upon the bottom wall 64 and the side walls 58 from baking to a hardened crust and thus will minimize the effort required in cleaning the utensil used for broiling. In cooperation with the air cooled broil pan the reflector element 30 should be provided with depending flanges 74 which drop below the upper edge 76 of the broil pan 48. In this manner any spatter evolved during the broiling process will be prevented from reaching the interior side walls 36 of the oven and an essentially clean broiling operation will result.

Figure 4:
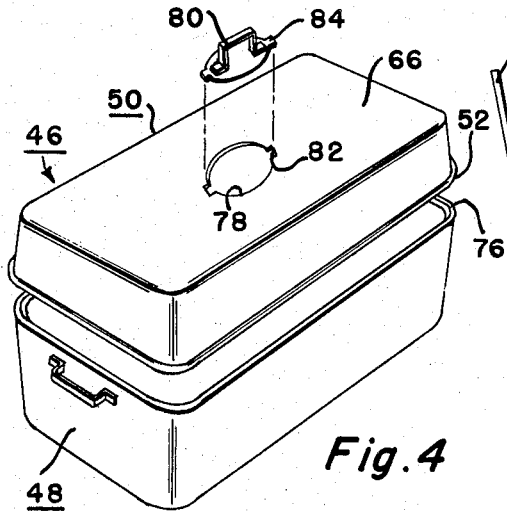
FIGURE 4 is an exploded perspective of the broil pan assembly showing a cover member which includes a removable handle for uncovering an air inlet to said assembly.

An exploded view of the applicant's novel combination air cooled broil pan and baking assembly 46 is best seen in FIGURE 4. The cover member 50 is shown with an opening 78 formed in the top wall 66 thereof for receiving a handle 80. As with the opening 32 in the support rack 22, notches 82 may be provided which cooperate with tabs 84 and the handle 80 for attachment of the handle to the cover member 50. When the cover member 50 is utilized as the air duct portion for the broil pan 48 during a broiling operation, the opening 78 overlies the opening 32 in the support rack 22 and the blower 40 may then direct air currents into the spaces 62 and 56 lying between the broil pan assembly members 48 and 50. It is within the purview of this invention to interlock the blower connecting piece 42 with both the rack 22 and the opening 78 merely by inserting the blower through both the openings 72 and 78 prior to rotating the blower into a locked engaging position therewith.

Figure 5:
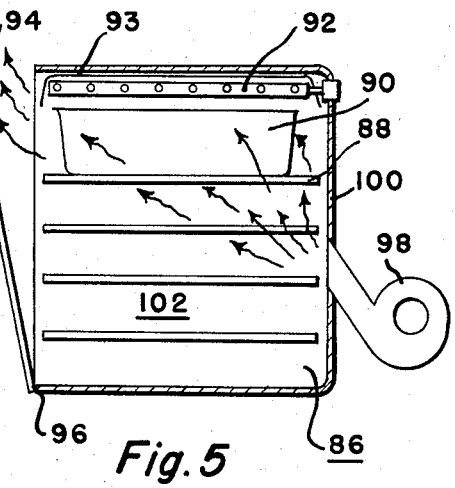
FIGURE 5 is a schematic side sectional view of an oven provided with forced draft cooling of a broil pan.

A second embodiment of this invention is shown in FIGURE 5 and includes an oven 86 similar to the oven 12 described for the preferred embodiment. In the oven 86 a support rack such as 88 is installed in a manner to hold a broil pan 90 in close proximity to a broil heating element 92. The oven 86 includes also a door 94 hingedly mounted at 96 which may be retained in a broil position as shown in FIGURE 5 during the broiling operation. In this arrangement a blower such as 98 is placed in one wall 100 of the oven 86 in a manner to direct air over the side and bottom walls of the broil pan 90. The blower 98 will receive its air from outside the oven 86 along the rear wall thereof and after flooding the side and bottom walls of the broil pan 90, the air will exhaust at the front of the oven as shown by the air flow arrows. Here also the object is to maintain the side walls of the broil pan 90 at a sufficiently low temperature to prevent the baking thereon of grease and spatter which is evolved during the broiling process. After the operation is over it has been found that the food spatter may be quickly washed from the sides of the broil pan 90 while the high sided relationship of the broil pan 90 to the broil heating element 92 and its reflecting plate 93 prevents spatter on the side walls 102 of the oven 86 as described in connection with the preferred embodiment.

Figure 6:
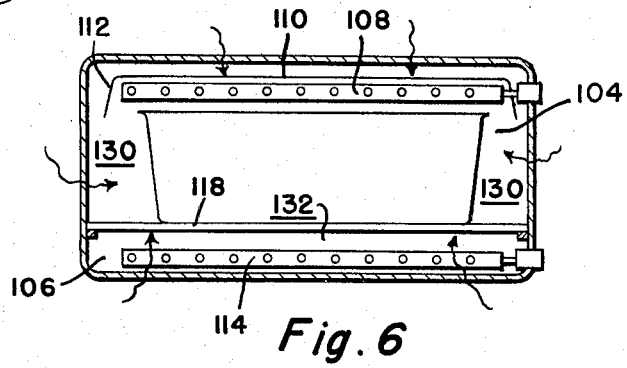
FIGURE 6 is a front sectional view of a relatively smaller broil oven shown in FIGURE 7.
Figure 7:
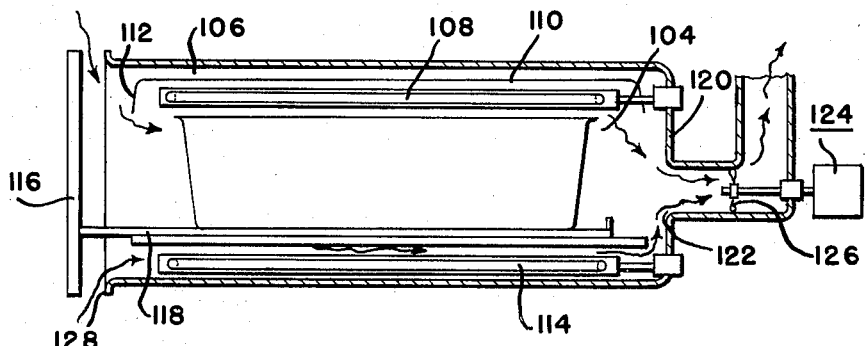
FIGURE 7 is a side sectional view of a relatively small broil oven having a drawer type closure and an induced draft cooling means.

Another embodiment of the applicant's invention is seen in FIGURES 6 and 7 and is directed also to an arrangement whereby a single high sided broil pan 104 is utilized. The oven shown generally at 106 includes a broil unit 108 having a reflector shield 110 with side flanges 112 which cooperate with the high sided broil pan 104 to prevent spatter upon the side and bottom walls of the oven 106. Included also is a baking heating element 114 which is not necessarily energized during a broiling process. The oven 106 is closed by a door 116 which is connected to a support shelf or rack 118 on which the broil pan 104 resides. Thus the door 116 and rack 118 may be withdrawn like a drawer, the broil pan 104 being carried thereby out of the oven 106. It will be noted that the oven 106 is comparatively small in relation to the ovens 12 and 86 described hereinbefore. This could conveniently be the second oven found on many of the conventional double oven electric ranges today. In FIGURE 7 the broiling operation in accordance with this invention is best seen. The rear wall 120 of the oven 106 is provided with an exhaust outlet 122 with which an induced draft fan 124 having an impeller 126 operates to withdraw air from the oven 106. During broiling the door 116 is left slightly ajar to leave an opening 128. With the broiling unit 108 in operation the blower 124 is energized to draw air to the oven 106 by means of the front opening 128. The relatively small size of the oven 106 defines narrow duct passages 130 along the sides of the broil pan 104 and the duct 132 along the bottom of the broil pan. Thus cooling air effectively blankets the side walls and bottom of the broil pan 104 during the broiling process and spatter is prevented from baking on the pan walls. FIGURES 5 and 7 are only diagrammatic showings of this invention. In actual design the blowers 98 and 124 would be arranged within the space at the back of a range conventionally allocated to electrical leads or to gas pipe manifolds.

In any of the aforementioned embodiments it is of course possible to energize the air cooling means by the energization of the broil unit. Furthermore it is within the purview of this invention to include a support rack having a blower attached thereto which may be energized by sliding the support rack into the oven. It should now be seen that a broiling arrangement has been provided whereby high sided pans in cooperation with a depending flanged broil unit are utilized to effectively block spatter from the interior walls of an oven as more fully taught in the copending application referred to. In addition, spatter is prevented from being baked on the surfaces of a broiling pan by the application of a cooling air flow thereto which is continuous during the broiling operation.

While the forms of embodiment of the invention as herein disclosed constitute preferred forms, it is to be understood that other forms might be adopted, as may come within the scope of the claims which follow.

What is claimed is as follows:

1. In combination with an oven, an electric heating element in said oven adjacent the top thereof, an inverted generally dish-shaped reflector element partially enclosing said heating element, support means located within said oven and having a blower connecting aperture therein, a broil pan assembly on said support means below said heating element, said broil pan assembly including a food containing portion and an inverted cover portion spaced from said food containing portion, said food containing portion having side walls in juxtaposition to said reflector, said cover member having an opening therein adapted to overlie said aperture in said support means when said cover member is in said oven, and a blower means connected to said aperture for cooling said food containing portion.

2. In combination with an oven, an electric heating element in said oven adjacent the top thereof, an inverted generally dish-shaped reflector element partially enclosing said heating element, support means located within said oven and having a blower connecting aperture therein, a broil pan assembly on said support means below said heating element, said broil pan assembly including a food containing portion and an inverted cover portion spaced from said food containing portion, said food containing portion having side walls in juxtaposition to said reflector, said cover member having a handle removable to form an opening therein adapted to overlie said aperture in said support means when said cover member is in said oven, and a blower means connected to said aperture and said opening for cooling said food containing portion.

3. An air cooled broiler pan assembly adapted for use in a domestic oven and comprising a food containing bottom member and a removable top cover member, said food containing member having a peripheral shoulder defining a top opening adapted to be closed by said cover member when said cover member is in overlying relationship to said food containing member, said cover member having a peripheral flange complementary with said peripheral shoulder when said cover member is in overlying relationship to said food containing member and defining an opening therein for receiving said food containing member therethrough when said food containing member is nested within said cover member, means on one of said members to space said one of said members from the other of said members when said food containing member is nested within said cover member, and an air impelling means connected to the space between said members for moving air between said members.

4. An air cooled broiler pan assembly adapted for use in a domestic oven and comprising a food containing bottom member and a removable top cover member, said food containing member having a peripheral shoulder defining an open top adapted to be closed by said cover member when said cover member is in overlying relationship to said food containing member, said cover member having a peripheral flange fitting within said peripheral shoulder when said cover member is in overlying relationship to said food containing member and defining an opening therein for receiving said food containing member therethrough when said food containing member is nested within said cover member, means on one of said members to space said one of said members from the other of said members is nested within said cover member, and an air impelling means connected to the space between said members for moving air between said cover member and said food containing member when said members are in a nested relationship.

5. In combination with an oven, a heating element in said oven adjacent the top thereof, an inverted generally dish-shaped reflector element partially enclosing said heating element, support means located within said oven and having a blower connecting aperture therein, a broil pan assembly on said support means below said heating element, said broil pan assembly including a food containing portion and an inverted cover portion spaced from said food containing portion, said food containing portion having side walls in juxtaposition to said reflector, said cover member having an opening therein adapted to overlie said aperture in said support means when said cover member is in said oven, and a blower means connected to said aperture for cooling said food containing portion.

References Cited by the Examiner
UNITED STATES PATENTS

| | | | |
|---|---|---|---|
| 1,754,232 | 4/1930 | Fisher | 165—122 X |
| 2,300,837 | 11/1942 | Ames. | |
| 2,456,988 | 12/1948 | Pierson | 99—446 |
| 2,599,003 | 6/1952 | Leonard | 165—80 X |
| 2,831,267 | 4/1958 | Gardner | 126—21 |

WALTER A. SCHEEL, *Primary Examiner.*

ROBERT E. PULFREY, *Examiner.*